(12) United States Patent
Koh et al.

(10) Patent No.: US 8,455,120 B2
(45) Date of Patent: Jun. 4, 2013

(54) SECONDARY BATTERY

(75) Inventors: Seok Koh, Suwon-si (KR); Nohyun Kwag, Suwon-si (KR)

(73) Assignee: Samsung SDI Co., Ltd., Yongin, Gyeonggi-so (KR)

( * ) Notice: Subject to any disclaimer, the term of this patent is extended or adjusted under 35 U.S.C. 154(b) by 744 days.

(21) Appl. No.: 12/635,491

(22) Filed: Dec. 10, 2009

(65) Prior Publication Data

US 2010/0151282 A1 Jun. 17, 2010

(30) Foreign Application Priority Data

Dec. 11, 2008 (KR) .................. 10-2008-0125841

(51) Int. Cl.
*H01M 14/00* (2006.01)
*H01M 2/00* (2006.01)
*H01M 2/26* (2006.01)
*H01M 2/28* (2006.01)
*H01M 2/08* (2006.01)

(52) U.S. Cl.
USPC ....... 429/7; 429/1; 429/61; 429/161; 429/175

(58) Field of Classification Search
USPC .................... 429/1, 7, 61, 161, 175
See application file for complete search history.

(56) References Cited

U.S. PATENT DOCUMENTS

| 5,181,409 | A * | 1/1993 | Heyes et al. ............... 72/46 |
| 2002/0056482 | A1* | 5/2002 | Katayama et al. ............. 138/138 |
| 2003/0108786 | A1* | 6/2003 | Aaltonen et al. ............ 429/61 |
| 2004/0048152 | A1* | 3/2004 | Yata et al. .................. 429/162 |
| 2005/0208345 | A1 | 9/2005 | Yoon et al. |
| 2005/0208346 | A1* | 9/2005 | Moon et al. ................. 429/7 |
| 2006/0257723 | A1* | 11/2006 | Tan et al. ................... 429/65 |
| 2006/0263679 | A1 | 11/2006 | Park et al. |
| 2006/0269838 | A1 | 11/2006 | Song et al. |
| 2007/0154785 | A1 | 7/2007 | Seo et al. |
| 2007/0287063 | A1 | 12/2007 | Hiratsuka et al. |
| 2008/0187823 | A1 | 8/2008 | Byun et al. |
| 2009/0311594 | A1 | 12/2009 | Uh |

FOREIGN PATENT DOCUMENTS

| CN | 1914748 | 2/2007 |
| CN | 101242092 | 8/2008 |
| EP | 1 926 160 A1 | 5/2008 |
| EP | 1 970 722 A3 | 9/2008 |
| JP | H10-208777 | * 8/1998 |
| JP | 2000-243364 | 9/2000 |
| JP | 2001-093497 A | 4/2001 |

(Continued)

OTHER PUBLICATIONS

Texas Instruments TPS 56121 EVM-601 Evaluation Module Mar. 2011.*

(Continued)

*Primary Examiner* — Patrick Ryan
*Assistant Examiner* — Aaron J. Greso
(74) *Attorney, Agent, or Firm* — Knobbe, Martens, Olson & Bear, LLP

(57) ABSTRACT

The present invention relates to a secondary battery. The present invention is aimed to provide a secondary battery having a thin upper case formed of a metal. The secondary battery includes a bare cell; a protection circuit module having a circuit board; an upper case formed of a metal and having a cover plate for covering the circuit board of the protection circuit module; and a case-insulating layer formed on an external surface of the cover plate of the upper case.

12 Claims, 6 Drawing Sheets

FOREIGN PATENT DOCUMENTS

| | | | |
|---|---|---|---|
| JP | 2002093386 | * | 3/2002 |
| JP | 2003-109554 | | 4/2003 |
| JP | 2003-178726 | A | 6/2003 |
| JP | 2003-257389 | | 9/2003 |
| JP | 2006012823 | * | 1/2006 |
| KR | 1020050080515 | | 8/2005 |
| KR | 1020050080516 | A | 8/2005 |
| KR | 1020060013936 | | 2/2006 |
| KR | 1020060027275 | A | 3/2006 |
| KR | 1020070038113 | | 4/2007 |
| KR | 100739968 | | 7/2007 |
| KR | 2007-0108765 | | 11/2007 |
| KR | 1020070113039 | | 11/2007 |
| KR | 100816218 | | 3/2008 |
| WO | WO 2008/050956 A1 | | 5/2008 |

OTHER PUBLICATIONS

Office Action dated Apr. 28, 2012 for corresponding CN Application No. 200910252927.3.
Notice of Allowance for related application KR 10-2008-0055049 dated Aug. 24, 2010.
Office Action dated Jun. 23, 2012 for corresponding JP Application No. 2009-279724.
Office Action dated Jan. 7, 2013 for corresponding CN Application No. 200910252927.3.

* cited by examiner

SECONDARY BATTERY

CLAIM FOR PRIORITY

This application is based on and claims priority to Korean Patent Application No. 10-2008-0125841 filed on Dec. 11, 2008 in the Korean Intellectual Property Office (KIPO), the entire contents of which are hereby incorporated by reference.

BACKGROUND OF THE INVENTION

1. Field of the Invention

The present invention relates to a secondary battery. More specifically, the present invention relates to a secondary battery having an upper case formed of a metal.

2. Description of the Related Art

With the rapid advance and development in recent years of electronic, information communication and computer industry fields, there is a gradual increase in the use of portable electronic devices. Rechargeable secondary batteries are largely used as a power source for portable electronic devices.

At present, a pack-type battery is widely used as a secondary battery. The pack-type battery is a form of the battery with integration of a bare cell and a protection circuit module (PCM) into one unit. The pack-type secondary battery includes a bare cell, a protection circuit module, and an upper case. The protection circuit module is attached to one surface of the bare cell, and the upper case is attached to cover the protection circuit module. An upper case of a conventional pack-type secondary battery is formed of a synthetic resin injection-molded material, so the secondary battery suffers from the following problems:

First, a conventional upper case is formed of an injection-molded material, and therefore cannot have a thickness thinner than that required for an injection molding process. For this reason, there is a limit to how much the secondary battery having the injection molded upper case can be downsized.

Second, there are problems in the outward appearance that are commonly observed in injection-molded materials. That is, drawbacks such as a weld line, s a thin line occurring at the junction of a resin upon injection molding, stress whitening of the product, and bubble marks occur in injection molded parts.

BRIEF SUMMARY OF THE INVENTION

Therefore, the present invention has been made in view of the above problems, and it is an object of the present invention to provide a secondary battery having a reduced size through use of an upper case formed of a metal.

It is another object of the present invention to provide a secondary battery including an upper case formed of a metal and having good insulation properties to thereby provide prevention of a possible short circuit.

It is a further object of the present invention to provide a secondary battery with firm attachment of an upper case.

In accordance with the present invention, the above and other objects can be accomplished by the provision of a secondary battery including a bare cell; a protection circuit module having a circuit board; an upper case formed of a metal and having a cover plate covering the circuit board of the protection circuit module; and a case-insulating layer formed on an external surface of the cover plate of the upper case.

The cover plate of the upper case includes a lower surface opposite to the circuit board of the protection circuit module, and the case-insulating layer may be formed on a lower surface of the cover plate of the upper case.

The circuit board of the protection circuit module has an upper surface opposite to the cover plate of the upper case, and may further include a circuit board-insulating layer formed on an upper surface of the circuit board of the protection circuit module. Further, the cover plate of the upper case includes a lower surface opposite to the circuit board of the protection circuit module and an opposite side of the lower surface, and the case-insulating layer may be formed on an upper surface of the cover plate of the upper case. Alternatively, the case-insulating layer may be formed on a lower surface of the upper case. The circuit board-insulating layer may be formed by an insulating tape attached to an upper surface of the circuit board. The insulating tape may be a double-sided tape that is also attached to the lower surface of the upper case.

The circuit board includes two or more terminal pads. The circuit board-insulating layer is provided with two or more exposure holes formed corresponding to each terminal pad of the circuit board. The upper case is provided with two or more terminal holes formed corresponding to each terminal pad of the circuit board. At least one of two or more exposure holes formed on the circuit board-insulating layer may be smaller than the corresponding terminal hole formed on the upper case. Further, a polarity of the terminal pad, corresponding to the exposure hole formed to have a smaller size than the terminal hole provided on the upper case, may be opposite to a polarity of a region in contact with the upper case in the bare cell.

The case-insulating layer may be a parylene coating layer, urethane coating layer, Teflon coating layer, ceramic coating layer or UV coating layer.

The upper case is formed of aluminum, and the case-insulating layer may be formed by an anodizing process.

The upper case may be formed of stainless steel.

The upper case may be made by a pressing process.

DETAILED DESCRIPTION OF THE PREFERRED EMBODIMENTS

Hereinafter, embodiments of the present invention will be described in more detail with reference to the accompanying drawings.

Figure 1:
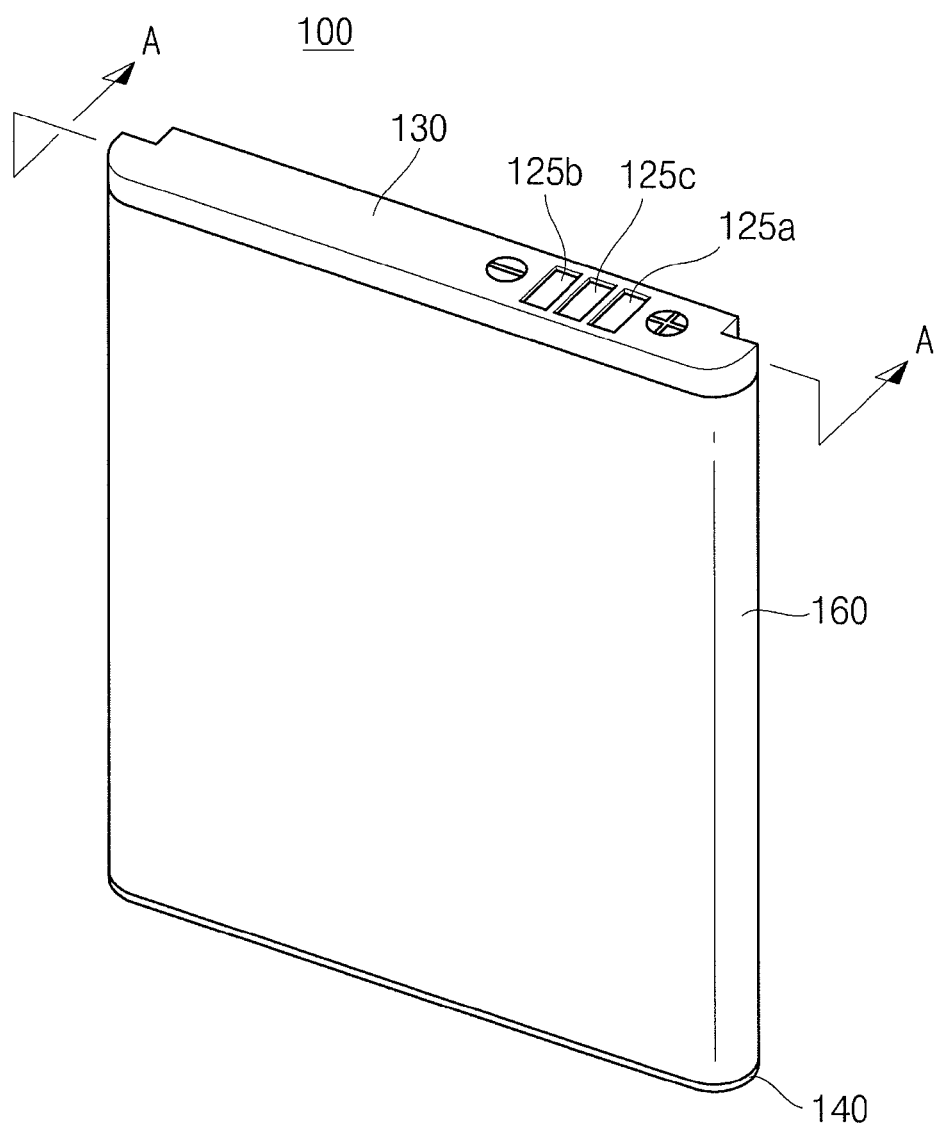
FIG. 1 is a perspective view of a secondary battery in accordance with one embodiment of the present invention.
Figure 2:
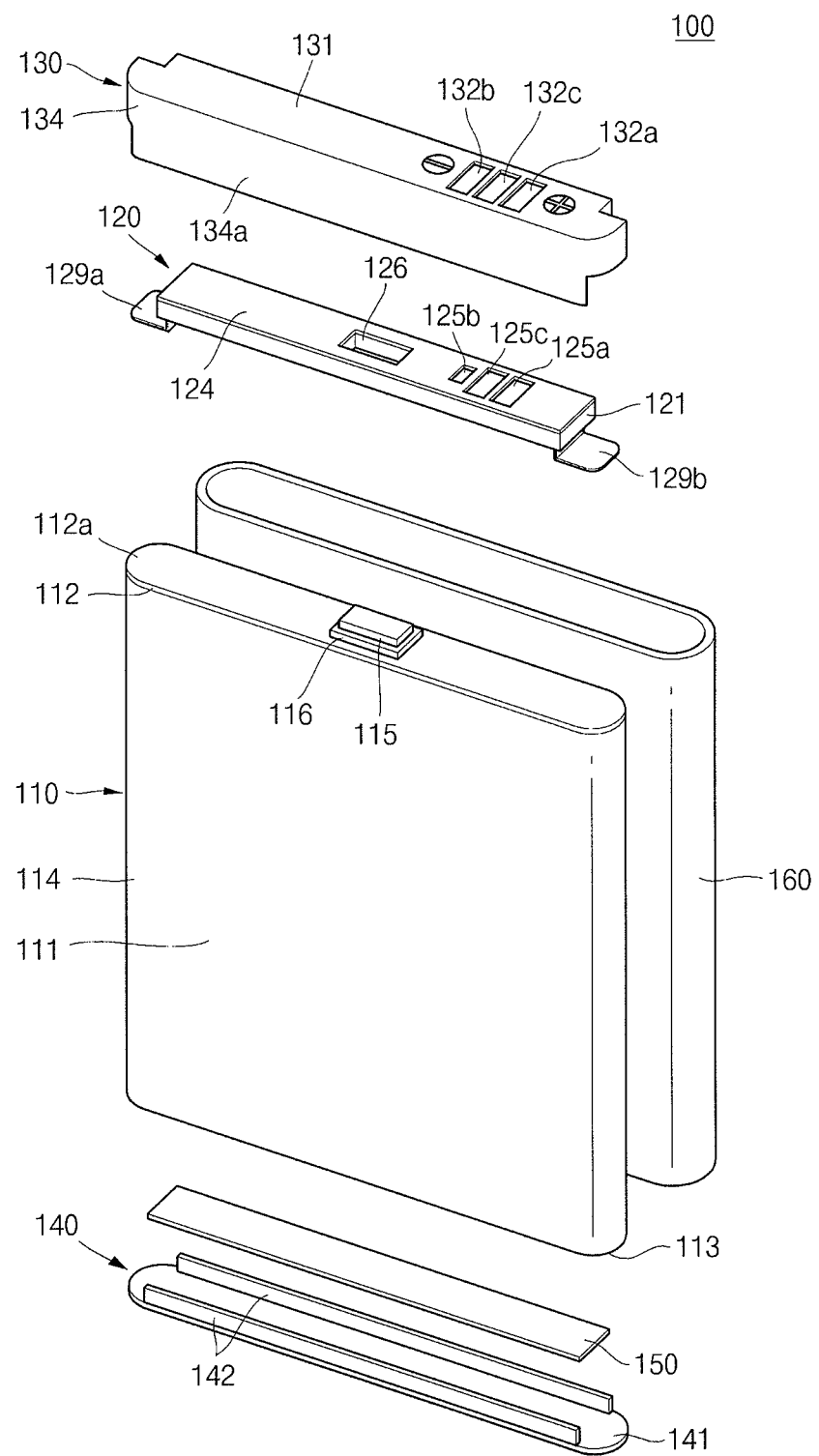
FIG. 2 is an exploded perspective view of a secondary battery shown in FIG. 1.
Figure 3:
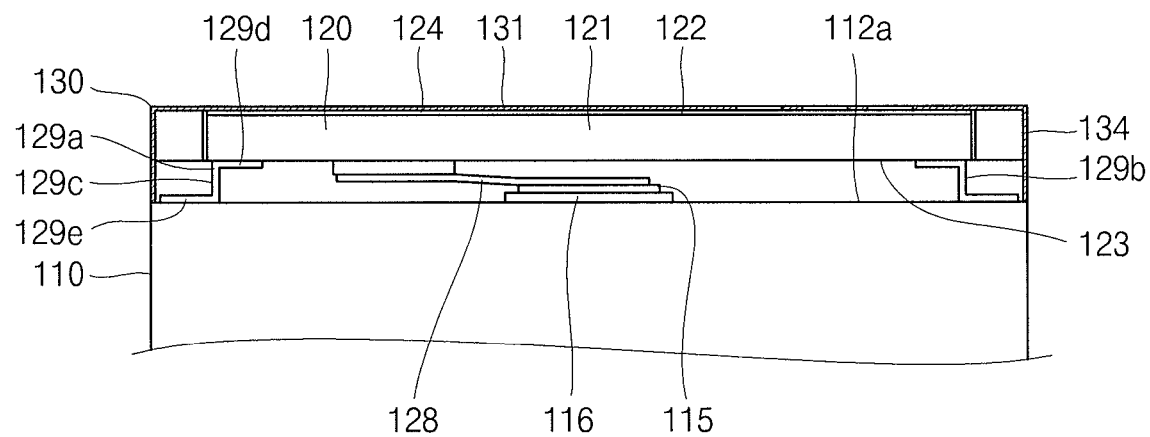
FIG. 3 is a cross-sectional view of an upper case of a secondary battery taken along the line A-A in FIG. 1.
Figure 4:
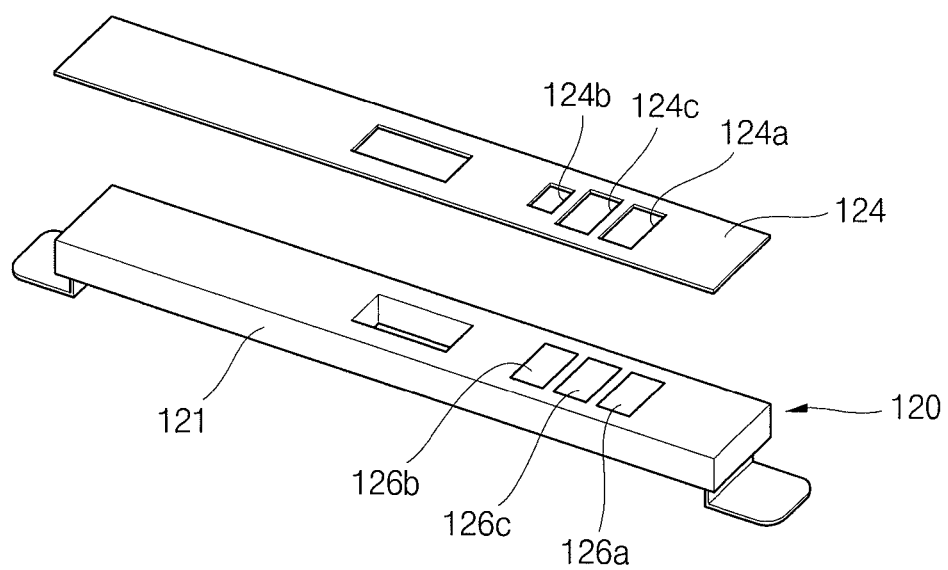
FIG. 4 is a perspective view of an insulating tape separated from a protection circuit module shown in FIG. 2.
Figure 5:
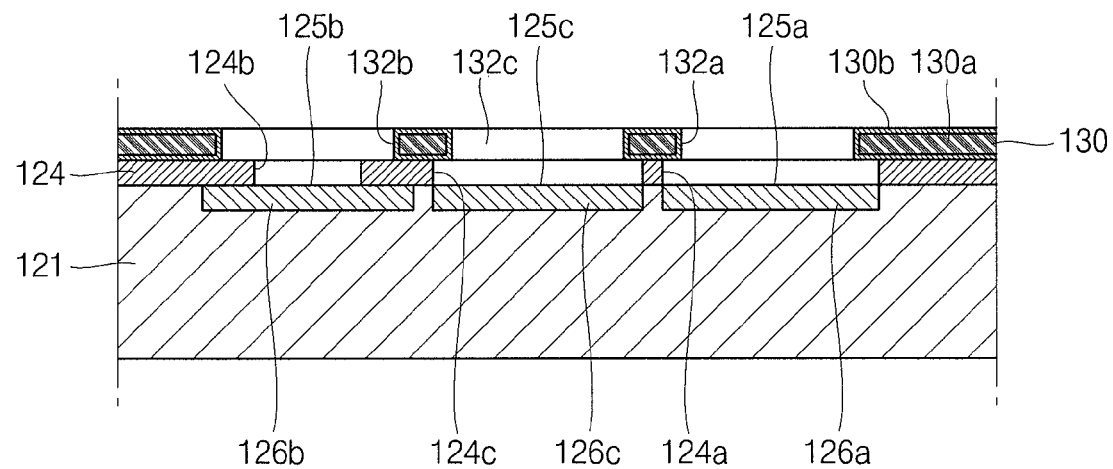
FIG. 5 is an enlarged cross-sectional view of a region with an external terminal in FIG. 3.
Figure 6:
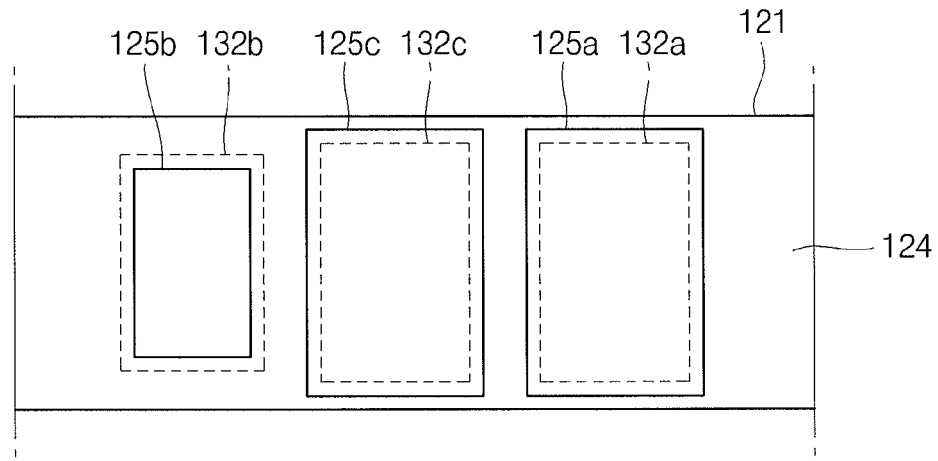
FIG. 6 is a plan view of a circuit board shown in FIG. 2, in conjunction with showing a position of a terminal hole formed on an upper case.

FIG. 1 is a perspective view of a secondary battery in accordance with one embodiment of the present invention. FIG. 2 is an exploded perspective view of a secondary battery shown in FIG. 1. FIG. 3 is a cross-sectional view of an upper case of a secondary battery taken along the line A-A in FIG. 1. FIG. 4 is a perspective view of an insulating tape separated from a protection circuit module shown in FIG. 2. FIG. 5 is an enlarged cross-sectional view of a region with an external terminal in FIG. 3. FIG. 6 is a plan view of a circuit board shown in FIG. 2, in conjunction with showing a position of a terminal hole formed on an upper case.

Referring to FIGS. 1 to 3, a secondary battery 100 includes a bare cell 110, a protection circuit module (PCM) 120, an upper case 130, a lower case 140, an adhesive member 150, and a label 160.

The upper case 130 is formed of a metal, and a surface of the upper case 130 facing opposite to a circuit board 121 of the PCM 120 is insulation-treated to thereby inhibit a possible short circuit between the upper case 130 and the PCM 120. Further, a surface of the circuit board 121 of the PCM 120 facing opposite to the upper case 130 is also insulation-treated to thereby inhibit a possible short circuit between the upper case 130 and the PCM 120.

The bare cell 110 supplies electrical energy and includes an electrode assembly (not shown) having a positive electrode, a negative electrode and a separator disposed therebetween, a can 111 made of a metal and for housing the electrode assembly and an electrolyte (not shown), and a cap assembly 112 for sealing an open part of the can 111. The cap assembly 112 includes a cap plate 112a formed of a metal, a first electrode terminal 115 formed protruding from the cap plate 112a, and a gasket 116 disposed between the cap plate 112a and the first electrode terminal 115 to provide electrical insulation therebetween. The present embodiment will illustrate a structural configuration where the first electrode terminal 115 functions as a negative electrode terminal.

The can 111 and the cap plate 112a will work as a second electrode terminal. The present embodiment will illustrate a structural configuration where the can 111 and the cap plate 112a serve as a positive electrode terminal. Although the present embodiment is given to address the structure where the first electrode terminal 115 acts as a negative electrode, and the can 111 and the cap plate 112a act as a positive electrode, the present invention is not limited thereto. Those skilled in the art will appreciate that an alternative form is also possible wherein the first electrode terminal 115 is a positive electrode, and the can 111 and the cap plate 112a serve as a negative electrode.

The PCM 120 includes a circuit board 121, a first electrode lead plate 128, a first support member 129a, and a second support member 129b. The PCM 120 controls the overall operations including charge/discharge of the secondary battery 100.

The circuit board 121 is a printed circuit board (PCB) with a wiring pattern printed thereon and is of a generally rectangular plate shape extending along the length direction of the cap plate 112a of the bare cell 110. The circuit board 121 includes an upper surface 122 and a lower surface 123 corresponding to a rear side of the upper surface 122. The upper surface 122 of the circuit board 121 is a surface facing opposite to a cover plate 131 of the upper case 130. The upper surface 122 of the circuit board 121 is provided with first, second, and third terminal pads 126a, 126b, 126c. The first terminal pad 126a of the circuit board 121 serves as a positive electrode terminal, the second terminal pad 126b serves as a negative electrode terminal, and the third terminal pad 126c serves as an auxiliary control terminal. Each of the terminal pads 126a, 126b, 126c is formed to have the same size. The upper surface 122 of the circuit board 121 is provided with a circuit board-insulating layer 124.

The circuit board-insulating layer 124, as shown in FIG. 4, is formed with attachment of an insulating tape 124 to the circuit board 121. The circuit board-insulating layer 124 insulates the circuit board 121 and the metallic upper case 130, thereby resulting in improved safety of the secondary battery 100.

The insulating tape 124 is provided with first, second, third exposure holes 124a, 124b, 124c formed in each region corresponding to first, second, third terminal pads 126a, 126b, 126c of the circuit board 121. The first exposure hole 124a at least partially exposes the first terminal pad 126a provided on the circuit board 121. The second exposure hole 124b partially exposes the second terminal pad 126b of the circuit board 121. The third exposure hole 124c exposes the third terminal pad 126c of the circuit board 121.

The first exposure hole 124a of the insulating tape 124 is formed to generally conform to the shape and size of the first terminal pad 126a of the circuit board 121, and exposes the first terminal pad 126a to the outside. The second exposure hole 124b of the insulating tape 124 is formed to have a size smaller than other exposure holes 124a, 124c and the second terminal pad 126b of the circuit board 121, and partially exposes an internal region of the second terminal pad 126b. The third exposure hole 124c of the insulating tape 124 is formed to generally conform to the shape and size of the third terminal pad 126c of the circuit board 121, and exposes the third terminal pad 126c to the outside.

In individual terminal pads 126a, 126b, 126c of the circuit board 121, regions 125a, 125b and 125c exposed by each of the exposure holes 124a, 124b, 124c of the insulating tape 124 are in contact with a battery charger (not shown) or a terminal (not shown) provided in an external load (not shown).

The embodiment of the present invention will be described with reference to the case where the insulating tape 124 is a double-sided tape. That is, one side of the insulating tape 124 is attached to the circuit board 121, and the other side thereof is attached to the cover plate 131 of the upper case 130, resulting in solid attachment of the upper case 130. In addition, the circuit board-insulating layer 124 may be formed by coating of an insulating material on the circuit board 121.

A lower surface 123 of the circuit board 121 is a surface opposite to the cap plate 112a of the bare cell 110. Although not shown, a plurality of electric circuit elements are mounted on the lower surface 123 of the circuit board 121. The electric circuit elements may include a control IC, a charge/discharge switch, a thermal fuse, and the like. A first support member 129a and a second support member 129b are attached to both ends of the lower surface 123. The lower surface 123 is opposite to and spaced apart from the cap plate 112a of the bare cell 110.

At the center of the circuit board 121 is provided a through-hole 126. The first electrode lead plate 128 is welded to a first electrode terminal 115 of the bare cell 110 via the through-hole 126.

The first electrode lead plate 128 is electrically connected to the circuit board 121, and is electrically connected to the first electrode terminal 115 of the bare cell 110 by welding or the like, for example. The welding process is carried out through the through-hole 126 of the circuit board 121. The first electrode lead plate 128 provides electrical connection between the circuit board 121 and the first electrode terminal 115 serving as a negative electrode of the bare cell 110.

The first support member 129a and the second support member 129b are respectively positioned at both ends of the circuit board 121. The first support member 129a includes a support portion 129c, a first connection portion 129d, and second connection portion 129e. The support portion 129c generally extends downward from the circuit board 121. The first connection portion 129d is connected to the top of the support portion 129c, whereas the second connection portion 129e is connected to the bottom of the support portion 129c. Two connection portions 129d, 129e are generally at a right angle to the support portion 129c. The extension direction of the first connection portion 129d from the support portion 129c is opposite to that of the second connection portion 129e from the support portion 129c. The first connection portion 129d is attached to a lower surface 123 of the circuit board 121. The second connection portion 129e is spaced apart from the circuit board 121. The second connection portion 129e is connected to the cap plate 112a of the bare cell 110 by welding or the like. The configuration of the second support member 129b is identical to that of the first support member 129a, so details thereof will be omitted herein.

The circuit board 121 is attached to be supported on the cap plate 112a of the bare cell 110 by the first support member 129a and the second support member 129b. As a result, the PCM 120 is attached to the bare cell 110. At least one of two support members 129a, 129b is formed of a conductive material, and therefore serves as a second electrode lead plate which provides electrical connection of the circuit board 121 to the can 111 and cap plate 112a serving as a positive electrode terminal of the bare cell 110.

The upper case 130 is provided with a cover plate 131 and a side wall 134 which extends downward from the cover plate 131. The upper case 130 accommodates the PCM 120 in an internal space thereof to thereby protect the PCM 120. The upper case 130 may be made by a pressing process of a metal such as aluminum. Therefore, as compared to a conventional upper case in the form of an injection-molded product having a thickness of at least 0.4 mm, the upper case 130 can be made to have a relatively thin thickness of about 0.1 mm, so it is possible to reduce a size of the secondary battery 100. The upper case 130 may also be formed of stainless steel (SUS) having excellent strength for the same thickness. Where it is desired to use stainless steel, there is no risk of corrosion even upon separation of a case-insulating layer 130b that will be illustrated hereinafter. Referring to FIG. 5, the entire external surface of the upper case 130 is provided with the case-insulating layer 130b. The case-insulating layer 130b imparts insulation properties to the upper case 130 made of a metal to thereby improve safety. The case-insulating layer 130b may be a parylene coating layer, urethane coating layer, Teflon coating layer, ceramic coating layer or UV coating layer. Further, the case-insulating layer 130b may be formed by an anodizing process when the upper case 130 is formed of aluminum. The case-insulating layer 130b insulates the metallic upper case 130 from the circuit board 121 to thereby improve safety of the secondary battery 100.

The cover plate 131 generally conforms to the shape of the cap plate 112a of the bare cell 110, and covers the PCM 120. The cover plate 131 is provided with first, second, third terminal holes 132a, 132b, 132c formed in each region corresponding to first, second, third exposure holes 124a, 124b, 124c of the circuit board-insulating layer 124. Three terminal holes 132a, 132b, 132c are generally formed to have the same size. Referring to FIG. 6, the first terminal hole 132a at least partially exposes the exposure region 125a of the first terminal pad 126a provided on the circuit board 121. The second terminal hole 132b completely exposes a region 125b of the second terminal pad 126b provided on the circuit board 121. Here, the second terminal hole 132b is formed to have a size larger than the exposure region 125b of the second terminal pad 126b, whereby the circuit board-insulating layer 124 is exposed to the inside of the second terminal hole 132b. As a result, it is possible to inhibit a possible short circuit between the second terminal pad 126b and the upper case 130 having a polarity which may be opposite to that of the second terminal pad 126b. The third terminal hole 132c at least partially exposes the exposure region 125c of the third terminal pad 126c provided on the circuit board 121.

The side wall 134 is formed extending downward from the outer periphery of the cover plate 131. The side wall 134 is provided with an extension portion 134a to enclose an upper part of the side surface 113 of the bare cell 110.

The lower case 140 is provided with a bottom plate 141 and two extension portions 142 extending upward from the bottom plate 141. The bottom plate 141 generally conforms to the shape of a lower surface 113 of the bare cell 110, and is attached to a lower surface 113 of the bare cell 110 by means of an adhesive member 150. Two extension portions 142 enclose lower parts of a side surface 114 of the bare cell 110. Similar to the upper case 130, the lower case 140 is formed of a metal with formation of an insulating layer (not shown). That is, the lower case 140 may be formed of a metal such as stainless steel or aluminum. Similar to the upper case 130, the insulating layer formed on the lower case 140 may also be a parylene coating layer, urethane coating layer, Teflon coating layer, ceramic coating layer or UV coating layer. The insulating layer formed on the lower case 140 may also be formed by an anodizing process when the lower case 140 is formed of aluminum. The lower case 140 is formed of a metal with formation of an insulating layer, so it is possible to further reduce a size of the secondary battery.

The label 160 is attached to enclose a side surface 114 of the bare cell 110. Further, the label 160 is attached to the extension portion 134a of the upper case 130 and the extension portion 142 of the lower case 140, such that the bare cell 110, the upper case 130 and the lower case 140 of the secondary battery 100 are firmly connected to one another.

Figure 7:
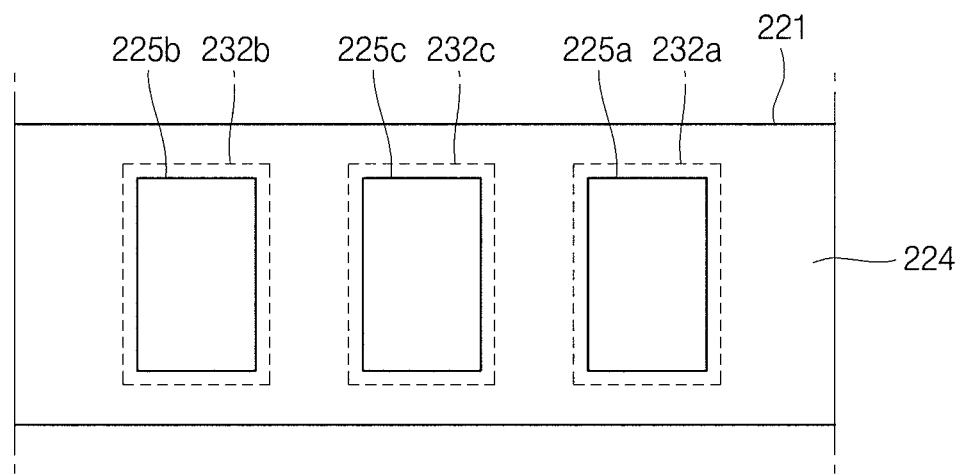
FIG. 7 is a plan view of a circuit board in accordance with another embodiment of the present invention, in conjunction with showing a position of a terminal hole formed on an upper case.

FIG. 7 shows another embodiment of the present invention. Referring to FIG. 7, all terminal holes 232a, 232b, 232c are respectively formed to have a size larger than exposure regions 225a, 225b, 225c of the corresponding terminal pads of a circuit board 221. In this case, insulation properties for the exposure regions 225a, 225b, 225c of all terminal pads are improved to thereby further increase safety of the secondary battery. The remaining configuration and operation of the present embodiment are the same as those in the previous embodiments of FIGS. 1 to 6, so details thereof will be omitted herein.

Figure 8:
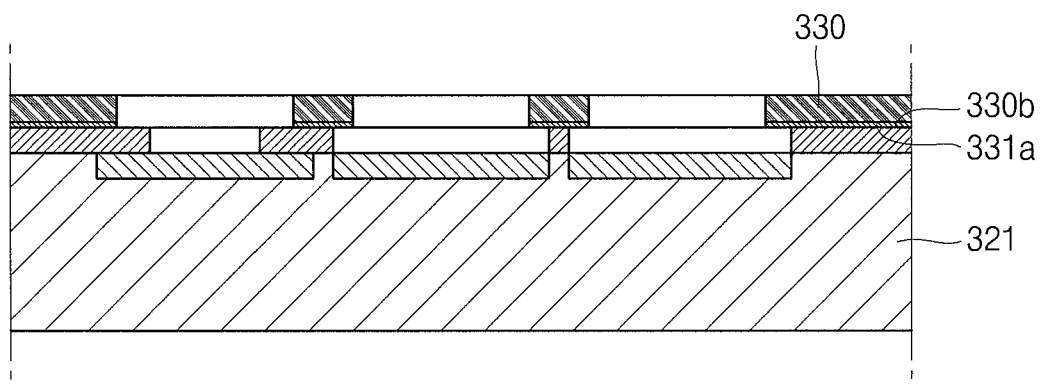
FIGS. 8 and 9 are respectively cross-sectional views of an upper case in accordance with another embodiment of the present invention.
Figure 9:
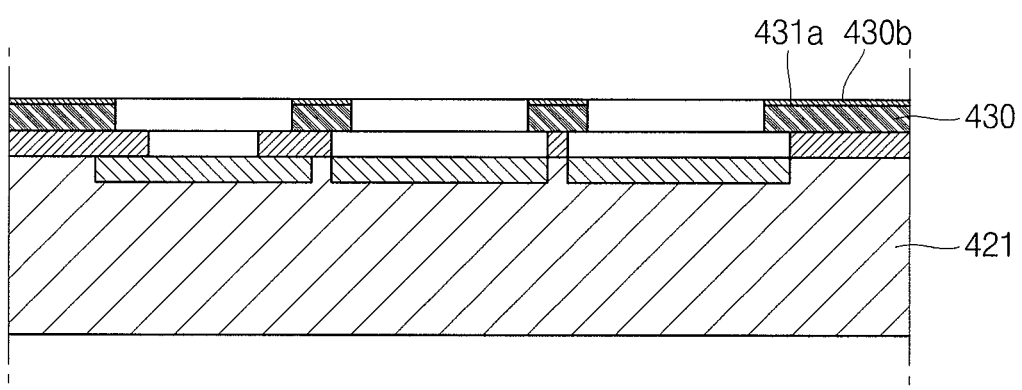

FIGS. 8 and 9 respectively show another embodiment of the present invention. Referring to FIG. 8, a case-insulating layer 330b may be formed only on a lower surface 331a of an upper case 330 opposite to a circuit board 321. In this case, a thickness of the upper case 330 can be further reduced. Further, as shown in FIG. 9, a case-insulating layer 430b may also be formed only on a upper surface 431a of an upper case 430 provided on the opposite side of a circuit board 421. Also in this case, a thickness of the upper case 430 can be further reduced. The remaining configuration and operation of the present embodiment are the same as those in the previous embodiments of FIGS. 1 to 6, so details thereof will be omitted herein.

As apparent from the above description, the configuration of the present invention enables achievement of aforesaid objects of the present invention. Specifically, an upper case for covering a circuit board is formed of a metal, so a thickness of the case can be further decreased. As a consequence, a size of a secondary battery can be reduced.

Further, since the metallic upper case is provided with an insulating layer, insulation properties of the upper case are secured even upon contact with the circuit board, thereby preventing a possible short circuit therebetween. Additionally, due to attachment of an insulating tape to the circuit board, insulation of the circuit board from the metallic upper case is further improved.

Further, the insulating tape is of a double-sided tape, so the upper case is attached to the circuit board, resulting in further solid attachment of the upper case to the secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery comprising:
   a bare cell;
   a protection circuit module having a circuit board;
   an upper case formed of a metal and having a cover plate for covering the circuit board of the protection circuit module;
   a case-insulating layer formed on an external surface of the cover plate of the upper case that is formed in a location of the cover plate to electrically insulate the metal case from the protection circuit module, and
   a circuit board-insulating layer formed on an upper surface of the circuit board of the protection circuit module and corresponding to the cover plate of the upper case;
   wherein the circuit board includes two or more terminal pads, the circuit board-insulating layer is provided with two or more exposure holes formed thereon for exposing only each terminal pad of the circuit board.

2. The secondary battery according to claim 1, wherein the cover plate of the upper case includes a lower surface opposite to the circuit board of the protection circuit module, and the case-insulating layer is formed on a lower surface of the cover plate of the upper case.

3. The secondary battery according to claim 1, wherein the cover plate of the upper case includes a lower surface opposite to the circuit board of the protection circuit module and opposite side of the lower surface, and the case-insulating layer is formed on an upper surface of the cover plate of the upper case.

4. The secondary battery according to claim 1, wherein the cover plate of the upper case includes a lower surface opposite to the circuit board of the protection circuit module, and the case-insulating layer is formed on a lower surface of the upper case.

5. The secondary battery according to claim 1, wherein the circuit board-insulating layer is formed by an insulating tape attached to an upper surface of the circuit board.

6. The secondary battery according to claim 5, wherein the insulating tape is a double-sided tape that is also attached to the lower surface of the upper case.

7. The secondary battery according to claim 1, the upper case is provided with two or more terminal holes formed corresponding to each terminal pad of the circuit board, and at least one of two or more exposure holes formed on the circuit board-insulating layer is smaller than the corresponding terminal hole formed on the upper case.

8. The secondary battery according to claim 7, wherein a polarity of the terminal pad, corresponding to the exposure hole formed to have a smaller size than the terminal hole provided on the upper case, is opposite to a polarity of a region in contact with the upper case in the bare cell.

9. The secondary battery according to claim 1, wherein the case-insulating layer is a parylene coating layer, urethane coating layer, Teflon coating layer, ceramic coating layer or UV coating layer.

10. The secondary battery according to claim 1, wherein the upper case is formed of aluminum and the case-insulating layer is formed by an anodizing process.

11. The secondary battery according to claim 1, wherein the upper case is formed of stainless steel.

12. The secondary battery according to claim 1, wherein the upper case is made by a pressing process.

* * * * *